Patented Oct. 9, 1945

2,386,213

UNITED STATES PATENT OFFICE 2,386,213

ADHESIVES AND METHOD OF MAKING SAME

Thomas Raymond Griffith, Ottawa, Ontario, Canada, assignor to The Honorary Advisory Council for Scientific and Industrial Research, Ottawa, Ontario, Canada, a corporation of Canada No Drawing. Application August 23, 1940, Serial No. 353,914

15 Claims. (Cl. 260—734)

This invention relates to rubber derivatives and to a method for preparing the same. It particularly relates to an improved adhesive for adhering rubber to metal.

Rubber conversion products, such as rubber derivatives having less unsaturation than rubber when it contains an equivalent quantity of combined added elements, have been prepared for adhering rubber to metal and for a base for coating compositions and the like. Generally, these derivatives have proven unsatisfactory for bonding rubber to metal because they are so thermoplastic (becoming more plastic than crude rubber at elevated temperatures) that the mold must be cooled before the composite article of rubber and metal is removed. Also, the bonded articles produced with these derivatives had relatively little strength at temperatures such as 100° C.

In my prior applications, United States Serial No. 277,086, filed June 2, 1939, and United States Serial Nos. 292,699 and 292,700, filed August 30, 1939, of which this application is a continuation in part, I have described rubber derivatives, and methods for preparing the same, having substantially non-thermoplastic properties, being less plastic than crude rubber at elevated temperatures. Composite articles united by such rubber derivatives may be readily removed from a hot mold without deleterious effects, but the hot strength of such articles is still much less than their cold strength.

It is, therefore, an important object of this invention to provide a method for improving the hot strength of rubber derivatives having less chemical unsaturation than the rubber.

While a single coat of solutions of the derivatives described in the above applications may be used for adhering rubber to metal, the bond produced is usually improved considerably when two or more coats of adhesives having decreasing hardness are successively applied to the metal before the rubber is vulcanized thereon.

It is another object of this invention to provide a solution of a rubber derivative which forms a strong bond when a single coat is suitably disposed between the rubber and the metal.

It is another object of this invention to provide a rubber derivative having improved properties, both when used as an adhesive and as a base for paints.

It is a further object of this invention to provide a rubber derivative which adheres rubber to metal with greater strength at both normal and elevated temperatures.

It is a still further object of this invention to provide a method for preparing rubber derivatives and solutions thereof having superior properties for bonding rubber to metal.

These and other objects, which will be apparent from the following description of the invention, are accomplished by incorporating vulcanizing agents, particularly sulphur, and/or a rubber vulcanization accelerator, into a rubber derivative which may be prepared by any of the various methods whereby one obtains a rubber derivative having less unsaturation than rubber when it contains an equivalent amount of any added elements combined with the carbon and hydrogen. These derivatives have carbon and hydrogen in the same ratio as in the rubber, and the hydrocarbon portion of the empirical formula of the most desirable derivatives is the same as natural rubber, namely $(C_5H_8)_x$. They may also have limited amounts of added elements combined with the carbon and hydrogen, or otherwise present, however.

The characteristics of the rubber derivative used as the base product in this invention for the preparation of adhesives and paints are, however, important and the stronger bonds are obtained when the less thermoplastic rubber derivatives are used. The most desirable rubber derivatives are prepared by incorporating into solid rubber, as by milling, conversion reagents which are adapted to convert rubber into an isomer of rubber or an isomer of rubber addition products having less chemical unsaturation than rubber or normal rubber addition products of the same composition, and which are usually either of an acidic character or are a mixture of ingredients which may combine to produce acidic materials; forming the mixture into thin sheets or into another form, such as rods, having a thin section; heating the sheets under suitably controlled conditions until the desired reaction occurs; and masticating the product to solubilize it.

The properties of the rubber derivative depend to a large extent on the reagent used in its formation. Certain of the reagents, however, give products that are more desirable than products produced with other reagents. Conversion reagents which, in general, have been found to give products with good properties may be mixtures of one or more salts of a strong acid in conjunction with a weakly acidic substance, with or without sulphur and selenium. It is thought that these conversion reagents have a polymerizing action on rubber under proper conditions and reduce the number of double bonds. The character of the product seems to be improved when the ingredients of the conversion reagent are solids, and is further improved when one or more of the solid substances contains considerable water of crystallization. The sulfates, and in particular the acid sulfates or doubles sulfates are preferred, especially when they contain considerable water of hydration. For best results, these materials are used with a suitable cooperating ingredient, such as a weakly acidic substance or a material such as $P_2O_5$ or $PCl_5$, which with water forms a weak acid. Aluminum acid sulfate, when properly used with a cooperating material of the character of phosphoric acid, produces rubber reaction products having exceptionally desirable properties.

Examples of the acid sulfates or double sulfates which are particularly desirable for use are those of aluminum, iron (both ferric and ferrous), the alkali metals, including ammonia, alkaline earth metals and the closely related alums, potassium alum and other alums. In addition to the acid sulfates, certain sulfates may be used advantageously. Examples of these are sulfates of iron (both ferric and ferrous), aluminum, copper, mercury and cadmium. Examples of salts of strong acids other than sulphuric acid are bromides of mercury and zinc, chlorides of mercury, tin and aluminum, and alkali metal iodides. Phosphoric acid is a very good example of a weakly acidic substance desirable for use in forming the rubber conversion product hereinbefore mentioned. For some uses, where it is desirable to have the conversion product somewhat more soluble in rubber solvents, oxalic acid has been used advantageously. Other weak acids that are also desirable for use are benzoic, tartaric, phthalic and salicylic. The particular acid may be selected for the properties it gives to the conversion product, as various acids seem to impart slightly different properties.

These weakly acidic materials, while assisting in the formation of the rubber derivatives, are not absolutely essential ingredients of the conversion reagents, and may in some cases be omitted. The quantity of salts of strong acids required to convert the rubber into the derivative is, however, much larger when the weakly acidic compound is omitted as a part of the conversion reagent. Thus, the rubber derivative may be prepared by using aluminum sulfate alone as the conversion reagent, but its properties as an adhesive are improved and the quantity of reagents required is decreased when phosphoric acid or other weak acid is also present.

In the preparation of the conversion products, the conversion reagent is milled or otherwise suitably mixed with the rubber until it is thoroughly incorporated. It has been found that the amount and the conditions of mastication also have an influence on the character of the conversion product produced. Products having less plasticity and greater strength are produced with given reagents when the amount of mastication is reduced to a minimum. Mastication in the presence of a liquid acid, such as sulfuric, sulfurous, sulfonic, etc., is particularly harmful. Conversion reagents of a solid nature are, therefore, preferred both because they may be quickly incorporated with a minimum of milling and the mastication of the rubber in the presence of such ingredients is less harmful to the character of the conversion product.

Preferably, there should be present in the mix from 1.5% to 15% of water, including any water of crystallization that may be present. The amount of water may vary outside of and beyond these limits for the production of materials with desired specific properties, but usually in the production of adhesives, 3% to about 9% or 10% of water should be present in the mix. Ordinarily, some free water is added during the mixing to bring the total quantity within this value.

Since water may be milled into the rubber more rapidly than liquid acids and the water and solid anhydride of a weak acid produce less deleterious effects on the rubber than liquid acids, it will be seen that it is advantageous to utilize a solid acid anhydride and water instead of liquid acids. Phosphoric acid is an example of the acid constituent of the reagent preferably used, and it is desirable to mix its solid anhydride ($P_2O_5$) into the rubber and then add any water desired.

The mixed product is preferably formed into relatively thin sheets or in a form of relatively thin section; the sheets usually have a thickness of about 3 or 4 mm., or so, and are placed in an oven with temperature control and heated for an appropriate period. The temperature and time of heating greatly affect the character of the reaction product. During the heating an exothermal reaction occurs and if the temperature of the sheets rises too high, the adhesive quality of the product will be weaker at elevated temperatures. The temperature in the sheets should not rise substantially higher than about 170° C., and superior products are obtained when the temperature remains considerably below this value. Preferably, the oven temperature should not be higher than about 140° C. to 155° C. The control of temperature is aided by the use of thin sheets having a thickness of about 2 or 3 mm., or even less. Also, the evaporation of the water contained in the sheets serves to keep the temperature down. If desired, an inert gas or air may be circulatd over the sheeted material in the oven.

It is preferred, however, to heat the mix in an atmosphere having less oxygen pressure than the partial pressure of oxygen in air, such as is obtained with an inert gas or in a vacuum. Ordinarily, a relatively high vacuum, such as about 500 mm., or more, of mercury is preferred. By carrying out the reaction in a vacuum, the tendency for portions of the thin sheets to become harder than others is substantially eliminated, and a more uniform product is obtained.

The formation of the mix into thin sections, such as sheets 1 mm. to about 7 or 8 mm., or preferably 2 to 3 mm., or so, is beneficial, regardless of the conversion reagent used, and is also important in facilitating the reaction, it being found that the reaction takes place with difficulty when relatively thick sections are used.

By the use of very thin sheets, such as 1 mm. or so in thickness, it is possible to carry on the reaction at temperatures as low as 100° C. to 105° C., and a derivative having higher molecular weight is produced which is relatively less soluble and relatively more elastic at elevated temperatures. The use of conversion reagents which are solid or volatilize with difficulty is advantageous in carrying out the reaction when the material is in the form of thin sheets. When readily volatile reagents are used and the mix is sheeted into thin sheets, sufficient of the reagent or reagents may be volatilized so that the reaction is incomplete, even in the middle of the sheet.

The sheeted material is heated for a sufficient time to allow the reaction to progress to the desired stage. A somewhat harder product is produced by increasing the quantity of conversion reagent, by heating a given mixture for a longer period of time at the same temperature, or by reducing the thickness of the sheets. The reaction takes place at lower temperatures when larger quantities of the conversion reagent are used or when the mix is sheeted to relatively thinner sheets. The reaction products produced at the lower temperature, however, are relatively less soluble on milling, particularly when the product is relatively soft.

After the reaction, the material is substantially insoluble in rubber solvents, but solubility may be restored by masticating the material for a sufficient time on a rubber mill or in a suitable mixer.

Solubility of the product depends to a large extent on the amount of mastication, and for the production of adhesives such as are desired for bonding rubber to metal, the mastication of the reaction product is preferably reduced to the minimum required for solubility. Working or mastication of the reaction product has a more harmful effect on the strength of the adhesive when acids are present and it is, therefore, preferable to incorporate a basic material into the product as soon as possible during this mastication period to neutralize any acids or acidic substance that might be present or formed during the reaction. In the making of a conversion product for use as an adhesive, an alkali, such as NaOH, may be used if desired, and the soluble salts removed with water, but it is usually preferable to add basic materials, such as oxides or carbonates of zinc, magnesium, etc., which neutralize acids and which may be left in the masticated product.

When the conversion product is to be used for the making of adhesives, powdered solids, such as zinc oxide, or finely divided, fibrous materials, such as short fiber asbestos, may be added to the conversion product as it is being reworked or remasticated. These materials appear to have the effect of improving the strength of the bond when the solution of the conversion product is used as an adhesive for bonding rubber to metal, etc.

When the conversion product is to be used in the manufacture of paints and the like, the product may or may not be neutralized. A somewhat increased solubility is obtained when residual acidic substances or acid pigments are present.

The quantity of conversion reagent used in forming the rubber conversion product is dependent on the character of the conversion product desired and the conversion reagent used. Larger quantities of conversion reagent, such as aluminum acid sulfate with phosphoric acid, give harder products when heated for a given length of time. When a weakly acidic compound is not present, a larger quantity of the acid salt of strong acid must be used to produce conversion products of the same hardness. This may amount to 50% or more of the rubber mixture. When a weak acid, such as phosphoric, is also present, the total of both ingredients of the conversion reagent may in some cases be less than 10% of the rubber mixture.

The characteristics of the derivatives produced are also somewhat dependent on the rubber used as a starting material, and the strongest adhesive is produced from rubber, such as pale crepe, smoked sheet, etc. Masticated rubber may, however, be used as a basis for preparation of the derivative, but it is desirable that the amount of mastication be kept at a minimum for the making of adhesives. Other rubberlike materials, such as reclaim rubber and African or Congo rubber, may be used for the production of rubber derivatives of the type herein disclosed.

It has now been found that when sulphur is incorporated in the rubber derivatives having less unsaturation than the rubber used in its preparation, such for example as are described above, the properties are greatly changed so that improved adhesives and paints are obtained.

The method of incorporating the sulphur, the presence of accelerators, the type of accelerators, the presence of additional vulcanizing agents, as well as the initial characteristics of the rubber derivative, affect the characteristics of the adhesive or paint produced.

In the preparation of an adhesive highly desirable for use as a single-coat adhesive, the rubber derivative is prepared as above set forth, dissolved in a rubber solvent, such as gasoline, and a substantial quantity of one or more rubber vulcanizing agents, such as sulphur or selenium, is mixed into the solution thus prepared. An accelerator should also be present in the mix to insure combination of the sulphur with the rubber derivative when the latter is heated during the preparation of composite articles having rubber vulcanized to a layer of adhesive applied on the metal.

While some of the sulphur added in this manner apparently combines with the rubber derivative while it is in solution, as is evidenced by the fact that the adhesive solution usually becomes more stringy, a major portion is present as suspended, free sulphur. When one or more coats of the adhesive are applied to metal and rubber vulcanized in contact therewith, free sulphur in the adhesive chemically combines with the rubber derivative, rendering it much less plastic and stronger at elevated temperatures, thus increasing the strength of the bonded article. Some of the free sulphur may migrate into the adjacent rubber during the vulcanization thereof, and thus produce a gradient having decreasing hardness from the surface of the rubber in contact with the adhesive.

More than 5% of the sulphur or equivalent vulcanizing agents incorporated in the adhesive in this manner noticeably improves the strength of the bonded article, particularly at elevated temperatures, but less than 5% of sulphur added in this manner does not improve the bonding strength. The quantity of sulphur preferably added is 15% or 20% by weight, based on the rubber derivative. Even more than 20% of sulphur may be present in the adhesive without greatly decreasing the strength of the bond, but it is preferable to maintain the percentage below 50% of sulphur.

The accelerator may be incorporated into the rubber conversion reagent mix prior to the reaction which forms a derivative having less chemical unsaturation than rubber, but it is preferable that it be incorporated in the derivative during the mastication or solubilization period. However it may also be added to the solution of the derivative. While rubber vulcanization accelerators in general are useful in the adhesives, the selection of the accelerator is very important in obtaining high bonding strength. Those having one or more primary amino groups, and particularly those having a plurality of amino groups, such for example as 2,4 diamino diphenylamine, or any accelerator which exerts a stiffening or antiplasticizing effect on solid rubber mixes, are much preferred. When an accelerator and/or an anti-oxidant such as meta-toluylenediamine or a member of the "Neozone" series, which produces stiffening action is used, the strength of the bond produced by the adhesive is greatly increased and the fullest benefits of this invention are obtainable, whereas when the usual accelerators which exert a plasticizing action on the mix are used, the strength of the bond obtainable between rubber and metal is much less at elevated temperatures.

When relatively large amounts of sulphur, such as 10% or 15% or more, are incorporated into the adhesive, it has been found that most of this amount must be added to the rubber derivative after it has been dissolved, for when a considerable amount of sulphur is masticated or milled into the rubber derivative, sufficient of the sulphur combines therewith to prevent the mixture from becoming soluble in petroleum solvents, even after continued milling. It has been found, however, that rubber derivatives having less unsaturation than a rubber with equal quantities of combined elements may contain as much as about 3% of combined sulphur, and while the unworked product is insoluble, it may be solubilized by milling or by suitable mastication. Even 3% of sulphur, all of which may be chemically combined with the adhesive base, improves the heat resistance of the bonds produced, and such a resinous material with combined sulphur has a lighter color and improved aging properties. It is particularly desirable as a base for paints.

If more than 3% of chemically combined sulphur is present in the above rubber derivative, or if difficulty is experienced in rendering it soluble by mastication, it has been found that solubility may be readily imparted thereby by masticating the insoluble or difficultly soluble rubber derivative either with a suitable quantity of an easily soluble rubber derivative, for example, sufficient of a derivative containing less than 3% of sulphur to bring the sulphur content below about 3% of the total, or with rosin or other readily soluble resinous materials.

Additional sulphur or selenium may also be added to solutions of the derivatives containing combined sulphur to further improve its bonding strength so that an exceptionally desirable adhesive for adhering rubber to metal is produced.

In the preparation of the soluble derivative containing combined sulphur, the sulphur, with or without an accelerator, may be incorporated by mastication either before or after the heating step, but if incorporated after the reaction the product should be again heated to insure combination of the sulphur, particularly when the rubber derivative is to be used as a paint base.

It is desirable to have some selenium present, as it appears to act as an antioxidant, so that the material has improved aging properties. The selenium may be incorporated by mastication in the mix before the exothermic reaction, or it may be incorporated later. When it is incorporated on the mill, or before the exothermic reaction takes place, it acts to increase the solubility and plasticity of the product.

The solubilizing effect of selenium is so marked that the amount of combined sulphur may be increased above 3% when selenium is present in the rubber derivative. Because of the plasticizing effect, however, it is undesirable that the amount of selenium added in this manner be excessive. The quantity of selenium which is present during the formation of the derivative should be such that the desired solubility is obtained without increasing the plasticity to an undesirable extent. Usually this quantity is less than 2% or so, and frequently .1% to .5% is sufficient. Larger amounts of combined selenium may be used when the amount of combined sulphur is larger.

Selenium may also be added to the solution of the rubber derivative and may take the place of a portion or all of the sulphur usually added to the solution. Its presence, uncombined with the derivative, seems to improve the strength of the bond when the derivative is used as an adhesive. The uncombined selenium added in this manner may be present in larger percentages than those desirable during the reaction forming the rubber derivative. Thus, 5% or 15% or so selenium may be used in the adhesive solution, with or without sulphur, which may also be present in amounts up to 15% to 25%, or 30% or so, if desired.

The harness and plasticity of the soluble but undissolved derivative of rubber are also important in producing an adhesive having the highest bonding strength. In fact when the hardness and plasticity are held within rather definite limits, it has been found that a single coat of the adhesive will produce a strong bond even though sulphur be omitted entirely.

For a single coat adhesive, particularly when free sulphur is absent, the most desirable range of hardness and plasticity of desirable derivatives, having less unsaturation than rubber which contains an equivalent amount of added elements chemically combined therewith, can readily be determined by hand tests. The hardest derivative, which is still suitable when free sulphur, etc. is absent, is just brittle at room temperature (23° C.), that is if the temperature is raised a few degrees, say 10 degrees, the material may be slowly bent in the hand in pieces, say one inch long and one-fourth inch thick. The softest material that may be used as a single coat is quite flexible and rubbery at room temperature.

Although better results are obtained when the quantity of conversion reagents is chosen so as to produce a solubilizable derivative without or with combined sulphur or selenium, or both, having a plasticity within the range above specified, good results are obtained with adhesives made from derivatives having hardness and plasticity outside of the range stated when free sulphur is present in substantial proportions.

The following examples, in which parts are by weight, illustrate the preparation of rubber derivatives and adhesives embodying this invention:

Example 1

| | Parts |
|---|---|
| Rubber (pale crepe or equivalent) | 500 |
| Aluminum acid sulfate | 44 |
| Phosphorus pentoxide | 11 |
| Water | 10 |
| Selenium | 1 |
| Sulphur | 2.5 |

The above ingredients were suitably mixed on a rubber mill and the mixture formed in a shape having relatively thin section, such as relatively thin sheets about 2 or 3 mm. thick or so. These thin sheets were then heated in a vacuum oven for 85 minutes at 140° C. whereupon an insoluble rubber derivative, having carbon and hydrogen in the same ratio as rubber and having less unsaturation than rubber when it contains equal quantities of combined sulphur and selenium or equivalent quantities of other elements, was produced. The specific empirical formula of this derivative is $(C_5H_8)_xS_ySe_z$, where $x$, $y$ and $z$ are numerical values.

Example 2

|   | Parts |
|---|---|
| Rubber (pale crepe) | 500 |
| Aluminum acid sulfate | 48 |
| Phosphorus pentoxide | 12 |
| Water | 10 |

The above ingredients were mixed, sheeted to thin section and heated as in Example 1 to procure a reaction product derived entirely from the rubber hydrocarbon. As is evidenced by iodine values, the rubber derivative thus produced has less chemical unsaturation than rubber and the empirical formula was the same as the base rubber, namely $(C_5H_8)_x$.

Example 3

The derivatives prepared in Examples 1 and 2, both of which have the desired properties for an adhesive base, were separately masticated on a rubber mill to render them soluble. During this mastication or solubilizing period, they were separately compounded in accordance with the following proportions:

|   | Parts |
|---|---|
| Above rubber derivatives | 100 |
| Magnesium oxide | 10 |
| Antioxidant (phenyl-beta-naphthylamine) | 2 |
| Carbon black | 40 |

These soluble, compounded derivatives, which have hardnesses and plasticities within the above described optimum range, were separately dissolved in suitable quantities of rubber solvents to produce cements having the desired viscosity. Composite articles of rubber and metal were prepared from both of the above cements by applying a single coat of the cement to a clean surface (preferably sand blasted) of the metal, allowing it to dry, and vulcanizing suitably compounded rubber thereon. When tested at room temperature, the bond between the rubber and the metal was around 600 lbs./sq. in. when either solution was used. However, the strength of the bond using the derivative prepared in Example 1 was somewhat better than that from the derivative of Example 2. When tested at 100° C., the bonds produced by the above cement containing the combined sulphur were stronger than those produced by the other cement. The strength of the bonds at the higher temperature was around 300 lbs./sq. in.

Example 4

The derivatives prepared in Examples 1 and 2 were separately masticated on a rubber mill to render them soluble. During this mastication or solubilizing period, they were separately compounded in accordance with the following proportions:

|   | Parts |
|---|---|
| Above rubber derivatives | 100 |
| Magnesium oxide | 10 |
| Antioxidant (phenyl-beta-naphthylamine) | 2 |
| Short fibre asbestos | 15 |
| Carbon black | 15 |
| Accelerator (2,4-diamino diphenylamine) | 2 |

These derivatives, which have hardnesses and plasticities within the above described optimum range were, after compounding as above, separately dissolved in suitable quantities of rubber solvents to produce cements having the desired viscosity.

Fifteen parts of finely ground sulphur, 80% or 90% of which passed through a 325 mesh screen, were incorporated by stirring in each of the cements. These cements thus prepared, when used as above to produce composite articles of rubber and metal or of rubber and a rigid material, produced bonds between the rubber and metal of such strength that the rubber tore in itself when the articles were tested at both elevated and normal temperatures.

Example 5

When 5 or 10 parts of finely ground selenium (based on the solid rubber derivative) were added by stirring to either of the cements prepared in Example 4, a single-coat adhesive forming an excellent bond between rubber and metal, but a weak bond between chloroprene (neoprene) and metal, was produced. However, if either of the cements of Example 4 contained 20% to 40% of a less volatile solvent such as kerosene, or a plasticizer such as light mineral oil, and about 5% selenium together with sulphur was added and stirred therein, the adhesive formed bonds having strengths of 850 lbs./sq. in. and 1200 lbs./sq. in., respectively, between neoprene and metal, and between rubber and metal. The percentages given are based on the rubber derivative.

Example 6

Particularly desirable compositions for adhering neoprene to metal are prepared in accordance with the following formulae:

|   | (1) | (2) |
|---|---|---|
|   | Parts | Parts |
| Rubber derivative of examples 1 or 2 | 100 | 100 |
| Neozone (25% meta-toluylenediamine; 50% phenyl-alpha-naphthylamine; 25% stearic acid) | 2 | 2 |
| Magnesium oxide | 15 | 15 |
| Asbestos | 15 | 15 |
| P33 (carbon black) | 15 | 15 |
| Sulphur (add to solution) | 20 | 20 |
| 2,4 diamino diphenylamine | 2 | 2 |
| Selenium | 5 | 5 |
| Litharge | 15 | 15 |
| Kerosene (add to solution) | | 43 |

The proportions of the ingredients in the above examples may, as pointed out above, be varied to produce rubber derivatives of varying degrees of hardness. In the preparation of composite articles, a plurality of coats of adhesive having the same or different hardnesses may be used if desired. Also, a rubber cement or tie cement containing part rubber and part rubber derivatives may be superimposed over the adhesive on the metal.

When the derivative of Example 1 is to be used as a paint base, it is preferred to increase the quantity of conversion reagents and selenium so that a harder and more readily soluble product than that of Example 1 is produced.

Although the aluminum acid sulfate and the phosphorus pentoxide have been set out in definite proportions in Examples 1 and 2 above, it is to be understood that such proportions have been given as illustrative of the invention, and the proportions may be varied considerably to produce useful exothermal reaction products. Other reagents, such as those mentioned herein which also effect exothermal reactions in a thinly sheeted rubber mix to form such reaction products, may be substituted for those specifically mentioned in the examples. Also, the specific amounts of compounding ingredients mentioned in the examples are understood to be illustrative and not to indicate critical values or those necessary for employment of these ingredients.

While pale crepe rubber, or the equivalent, has been specified in Examples 1 and 2, and such rubber is usually preferred it is to be understood that other types of rubber may be substituted therefor. Such other types of rubber may comprise reclaim rubber or rubberlike materials, such as synthetic rubbers having an unsaturated structure similar in nature to rubber, and which will undergo a polymerizing or cyclizing reaction to produce a solubilized product having less unsaturation than the raw material when it contains an equivalent amount of added elements chemically combined therewith.

By far the strongest and most heat resistant bonds between rubber and metal are produced when derivatives are prepared, in the manner set forth above, by incorporating the above conversion reagents into solid rubber and heating the rubber mix in a form having thin section. It has been found, however, that the strength and heat resistance of bonds, produced from rubber derivatives in general which fulfil the qualification of having less unsaturation than rubber when it contains an equivalent percentage of combined added elements, are increased by the addition of vulcanizing agents, such as sulphur, to their solutions or dispersions in accordance with this invention. Thus the bonding strength and heat resistance of the thermoplastic rubber derivatives described in Fisher Patent 1,605,180, as well as the chlorine-containing polymerized derivative of rubber set forth in the Brunson Patent 1,797,188, are improved when sulphur and accelerators are incorporated as above in solutions or dispersions of these materials.

This invention is chiefly concerned with soluble, solid derivatives of natural rubber hydrocarbons, such as Hevea rubber, which has the empirical formula $(C_5H_8)_x$, which derivatives have less unsaturation than Hevea rubber when it contains an equivalent quantity of one or more added elements, such for example as chlorine, sulphur, selenium, and tellurium, chemically combined therewith. It has also been found, however, that synthetic rubbers, such as polymerized butadiene bodies and even a polychloroprene (neoprene) and mixtures of these materials with natural rubber, and others, form derivatives when heated with the acidic or acid forming rubber conversion reagents in substantially the same manner as set forth above. These derivatives also have the same carbon and hydrogen ratio as their parent synthetic rubber and have less unsaturation than the synthetic rubber when it contains an equal amount of any added elements combined therewith. They are especially desirable for bonding the synthetic rubbers to metal. The bond produced by these soluble derivatives is also strengthened and improved when sulphur or selenium is incorporated in their solutions.

The rubber derivatives susceptible of improvement according to the present invention by incorporating vulcanizing agents in their dispersions or solutions are members of the group consisting of isomers of rubber and isomers of incompletely saturated addition products of rubber. They are not completely saturated, but they have less chemical unsaturation than the rubber or the simple addition products of the rubber with which they are isomeric. Thus, for example, although the derivatives contemplated in the present invention may have the empirical formula of the usual incompletely saturated halogen, hydrohalogen, sulphur or selenium addition products of rubber, they are distinguished from such simple (substantially unpolymerized) addition products of the same chemical composition by having less chemical unsaturation.

It is desirable that the derivatives have some unsaturated double bonds in order that vulcanizing agents may more readily affect bridges between molecules during the curing operation and a higher heat resistance may be obtained in the composite article produced. The isomers of the addition products of rubber, and particularly the isomers of sulphur and selenium addition products of rubber, have been found to be more desirable for the purposes of the present invention than the rubber isomers.

When it is desired to compound an adhesive for use either for adhering rubber to metal or adhering a synthetic rubber, such as neoprene (polychloroprene), to metal, it is desirable to incorporate a substantial amount of a solvent of relatively low volatility, such as kerosene, or a plasticizing agent, such as light mineral oil, in the solutions of the adhesive, as it has been found that this considerably improves the adhesion of synthetic rubbers to metal, and also forms a good bond between rubber and metal.

While the vulcanizing agents, sulphur and selenium, have been mainly emphasized throughout the specification, it is to be understood that tellurium, and even vulcanizing types of accelerators, such as tetramethylthiuram disulphide, etc., may be used, either for the composition for the adhesive or for the paint.

In the appended claims, the term "rubber" unless specifically qualified is intended to include synthetic rubbers as well as natural rubber, and the term "rubber derivative" is intended to include derivatives of natural and the synthetic rubbers which form soluble rubber derivatives when treated with the conversion reagents, heated and masticated as above described, such synthetic rubbers being generally those vulcanizing or combining chemically with sulphur.

It is to be understood that variations and modifications of the procedures herein shown and described for purposes of illustration may be made without departing from the spirit of the invention.

What I claim is:

1. In a method of producing adhesives of a type having desirable properties for bonding rubber to metal, the steps which comprise forming a solution of cyclized rubber derivative having the same carbon to hydrogen ratio as the rubber from which it was derived and having less chemical unsaturation than the rubber and any incompletely saturated rubber addition products of the same percentage composition as said derivative, and incorporating 5% to 50% of sulphur based on said derivative throughout said dissolved derivative, said derivative being the heat reaction product of a mixture of rubber and an agent capable of cyclizing rubber, the greater portion of said sulphur being distributed through said derivative after said derivative was dissolved.

2. A rubber-to-metal adhesive having as its principal organic constituent a solution of an organic solid, which consists of an unsaturated isomer of an incompletely saturated rubber addition product having the same carbon to hydrogen ratio as rubber and having less chemical unsaturation than both rubber and rubber addition products of the same percentage composition with which it is an isomer, said solution containing about 5% to about 50% of sulphur, based on the weight of the dissolved organic constituent.

3. In a method for improving the heat resistance of an adhesive film of a cyclized unsaturated rubber derivative having the same carbon to hydrogen ratio as the rubber from which it was derived and having less chemical unsaturation than the rubber or any unsaturated rubber addition products of the same percentage composition with which it is isomeric, the step which comprises mixing at least 5% sulphur with said derivative prior to forming said film, a substantial proportion of said sulphur being incorporated intimately through said derivative after forming the solution thereof.

4. An adhesive for bonding rubber and compounds thereof to a rigid material comprising a solution of a rubber derivative prepared by reacting with heat in a form having thin section a mixture of rubber, a salt of a strong acid and water, said derivative being characterized by having the same carbon to hydrogen ratio as rubber, by having less plasticity than does rubber at elevated temperatures of the order of 100° C., and by having less chemical unsaturation than rubber and simple unsaturated rubber addition products with which it is an isomer, said adhesive containing about 5% to about 50% of sulphur based on said derivative.

5. An adhesive for bonding a rubber and compounds thereof to a rigid material, comprising a solution of a rubber derivative having the same carbon-to-hydrogen ratio as rubber and having less chemical unsaturation than any rubber addition product of the same percentage composition, which solution contains about 5% to about 50% of sulphur, based on the amount of the solid rubber derivative in said solution.

6. An adhesive for bonding a rubber and compounds thereof to a rigid material, comprising a solution of a rubber derivative having the same carbon-to-hydrogen ratio as the rubber from which it was derived and having less chemical unsaturation than any rubber addition product of the same percentage composition, which solution contains about 5% to about 50% of elements selected from the group consisting of sulphur, selenium, and tellurium, said percentage being based on the amount of the solid rubber derivative in said solution.

7. An adhesive for bonding a rubber and compounds thereof to a rigid material, comprising a solution of a rubber derivative containing up to about 3% of combined sulphur and having the same carbon-to-hydrogen ratio as rubber and less chemical unsaturation than a simple rubber addition product of the same percentage composition, said solution being further characterized by having about 5% to about 50% of sulfur chemically uncombined with said rubber derivative.

8. The adhesive of claim 6 also containing a vulcanization accelerator of a type having an anti-plasticizing effect when it is incorporated in solid unvulcanized rubber.

9. The adhesive of claim 6 also containing 2,4-diamino-diphenylamine.

10. The adhesive of claim 6 also containing a member of the group consisting of accelerators and anti-oxidants for rubber, which accelerators and anti-oxidants are characterized by having an anti-plasticizing effect on uncured solid rubber mixes when incorporated therein.

11. An adhesive for bonding a rubber and compounds thereof to a rigid material, comprising a solution of a rubber derivative having the same carbon-to-hydrogen ratio as rubber and having less chemical unsaturation than any rubber addition product of the same percentage composition, said solution being further characterized by containing selenium in an amount up to 15% of said derivative and about 5% to about 50% of sulphur, which sulphur is based on said derivative and is not chemically combined therewith.

12. The adhesive of claim 6 containing sulphur in amounts of about 15% to about 50% of the weight of the rubber derivative.

13. An adhesive for bonding rubber and compounds thereof to a rigid material comprising a solution of a rubber derivative prepared by reacting with heat in a form having thin section a mixture of rubber, a salt of a strong acid and water, said derivative being characterized by having the same carbon-to-hydrogen ratio as rubber, by having less plasticity than does rubber at elevated temperatures of the order of 100° C., and by having less chemical unsaturation than rubber and simple unsaturated rubber addition products with which it is an isomer, said adhesive containing about 15% to about 50% of sulphur chemically uncombined with said rubber derivative, said amount of sulphur being based on the quantity of the solid rubber derivative in said adhesive.

14. In a method of producing an adhesive for bonding a rubber or compounds thereof to a rigid material, which adhesive has as an ingredient a rubber conversion product characterized by having less plasticity than has crude rubber at temperatures of the order of 100° C., by having less chemical unsaturation than rubber or rubber addition products with which it is an isomer, by having the same carbon-to-hydrogen ratio as rubber, and by being the heat reaction product of a masticated mixture of solid rubber and a rubber conversion reagent comprising a salt of a strong acid and water, the steps which comprise incorporating sulphur into a solution of said rubber derivative, said sulphur being present in the amounts of about 5% to about 50% of the weight of said derivative, the major portion thereof being incorporated with said derivative after forming a solution thereof in a suitable solvent.

15. The method of claim 14 in which selenium is incorporated with said rubber derivative prior to forming a solution thereof.

THOMAS RAYMOND GRIFFITH.